G. G. NOAH.

Machines and Processes for Making Paste.

No. 5,289. Reissued Feb. 18, 1873.

Witness:

Henry N. Miller

L. L. Everts

Inventor.

George G. Noah.

per Shaw & Thacher.

Attorneys.

UNITED STATES PATENT OFFICE.

GEORGE G. NOAH, OF BOSTON, MASSACHUSETTS.

IMPROVEMENT IN MACHINES AND PROCESSES FOR MAKING PASTE.

Specification forming part of Letters Patent No. 73,115, dated January 7, 1868; antedated December 26, 1867; reissue No. 5,289, dated February 18, 1873.

*To all whom it may concern:*

Be it known that I, GEORGE G. NOAH, of Boston, in the county of Suffolk and State of Massachusetts, have invented certain new and useful Improvements in Process and Apparatus for Making Paste; and I do hereby declare the following to be a full, clear, and exact description thereof, reference being had to the accompanying drawing, and to the letters of reference marked thereon.

Paste has heretofore been made by cooking and boiling the same, and also by mixing it with suitable machinery; but either process, or both at different times, makes an inferior quality of paste. I have found by experiments that the necessary things to make the best quality of paste are the thoroughly mixing it together, and cooking and boiling it at one and the same time; and also that the cooking and boiling by steam is preferable to any other mode.

The nature of my invention, therefore, consists in introducing steam into the paste-tub to permeate the contents thereof for the purpose of cooking and boiling the same at the same time as the said contents are being thoroughly mixed together. My invention also consists in the construction of an apparatus or machine for carrying said process into effect.

In order to enable others skilled in the art to which my invention appertains to make and use the same, I will now proceed to describe the construction and operation of an apparatus by which my process may be carried out, referring to the annexed drawing, in which—

Figure 1:
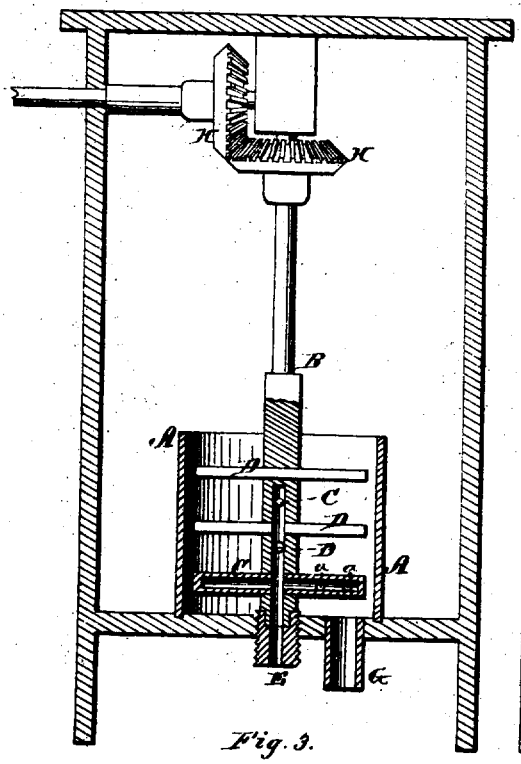
Figure 2:
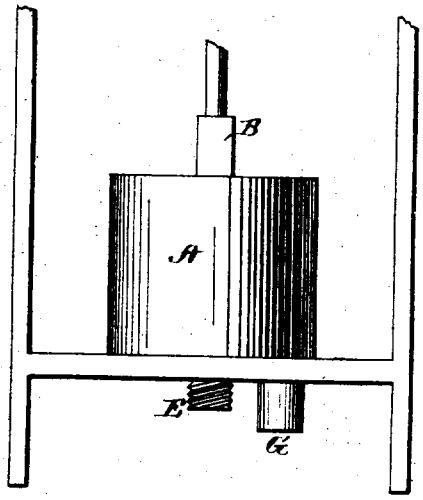
Figure 3:
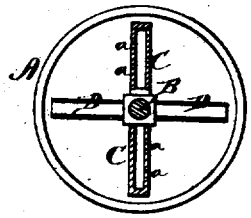

Figure 1 is a vertical section of my machine. Fig. 2 is a side elevation of the tub, with discharge and inducting pipes and shaft; and Fig. 3 is a plan view of the tub.

A represents the tub which holds the paste, and which may be made of any requisite size, according to the amount of paste to be made. It may be made of wood or iron, or any other suitable material. B is the revolving shaft, revolving in the center of the tub, and is hollow up to above the highest perforated arm, so that steam from this shaft may pass into the perforated arms. C C are the perforated arms attached to the shaft B, which arms are hollow, and into which the steam passes from the hollow shaft B, and through the perforations in said arms into the contents of the tub. D D are unperforated arms attached to the revolving shaft, and, like the perforated arms C C, revolving with it for the purpose of mixing the paste. E is the inducting-pipe, introducing the steam to the hollow shaft and perforated arms. *a a* are the holes or perforations in the arms C C, through which the steam passes into and cooks and boils the paste. G is the discharge-pipe, by which the paste, when properly mixed, cooked, and boiled, is let out of the tub into suitable vessels for use. H H are bevel-gears, so arranged as to revolve the shaft B.

Thus it will be seen, that the shaft once set in motion, with the steam let on, the whole mass in the tub will be permeated with the steam, and thus boiled and cooked at the same time that it is thoroughly mixed by the revolving arms.

The arms in this machine are placed at right angles to each other, and a perforated arm is placed at the bottom, and two unperforated ones between that and the next perforated arm above. But this order is not requisite; they may be put at acute or oblique angles to each other; but I prefer to use the present arrangement for inducting the steam, and of the arms, both as to the angle at which they shall be placed to each other, and the order, one above another, as I believe the paste will thereby be most effectually permeated and best cooked.

All the arms may be perforated.

Having thus fully described my invention, what I claim as new, and desire to secure by Letters Patent, is—

1. The process herein described for making paste by the introduction of steam into the paste-tub to permeate the contents thereof, for the purpose of cooking and boiling the same at the same time that said contents are being thoroughly mixed together.

2. The hollow perforated arms C C, attached to the hollow revolving shaft B for the purpose of admitting the steam into the contents of the paste-tub at the same time as said contents are being mixed together, substantially as herein set forth.

3. The combination of the hollow revolving shaft B, hollow perforated arms C C, and the unperforated arms D D, all arranged within the p t -tub A, substantially as and for the purposes herein set forth.

In testimony that I claim the foregoing I have hereunto set my hand the 4th day of January, 1873.

GEORGE G. NOAH.

Wi nesses:
C. L. EVERT,
A. N. MARR.